Jan. 7, 1958     A. FINSTERWALDER     2,818,709

TORQUE CONVERTER

Filed Sept. 10, 1956

INVENTOR

Albert Finsterwalder

By (signature)
Patent Agent.

United States Patent Office 2,818,709
Patented Jan. 7, 1958

2,818,709
TORQUE CONVERTER

Albert Finsterwalder, Koln-Bruck, Germany, assignor to Klöckner-Humboldt-Deutz Aktiengesellschaft, Koln, Germany Application September 10, 1956, Serial No. 609,005

2 Claims. (Cl. 60—54)

The present invention relates to torque converters and, more particularly, to torque converters having a reaction member or guide stage adapted to be free wheeled.

Torque converters with fixed reaction member or guide stage have the drawback that when the turbine is under no load, the torque converter has a high racing speed while the input power is completely absorbed and in some instances is even increased so that losses due to heat are rather high.

It has been suggested in order to overcome the above mentioned drawback to free wheel the reaction member or guide stage when the turbine is under no load. Such an arrangement, however, had the drawback heretofore that when the reaction member is free wheeling, the guidance of the fluid flow and the speed of rotation of the reaction member is left to chance and is not stable. Furthermore, only when pump and turbine are arranged symmetrically with regard to each other, will, when the turbine is under no load, the turbine speed be higher than the speed of the free wheeling reaction member.

It is, therefore, an object of the present invention to provide a torque converter with a reaction member or guide stage adapted to be free wheeled, which will overcome the above mentioned drawbacks.

It is another object of this invention to provide a torque converter with reaction member adapted to be free wheeled, in which the reaction member or guide stage will be prevented from obtaining too high speeds.

It is still another object of this invention to provide a torque converter with reaction member or guide stage adapted to be free wheeled, in which the reaction member when being free wheeled will be kept in a stable condition and in which the required flow per time unit from pump to turbine and back to the pump will be maintained within the circuit of circulation.

These and other objects and advantages of the invention will appear more clearly from the following specification in connection with the accompanying drawing, in which.

Figure 1:
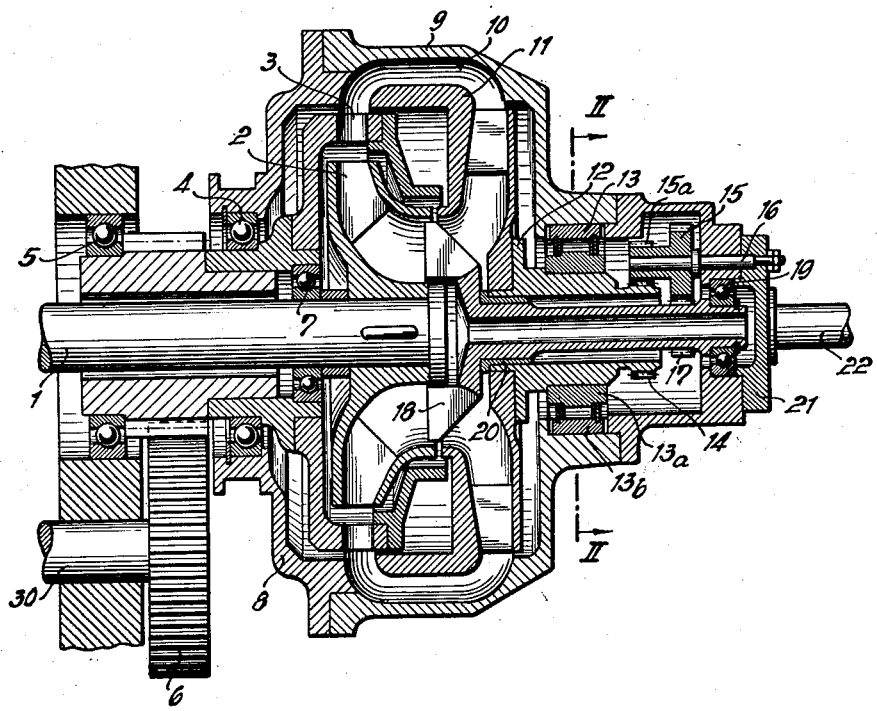
Fig. 1 is an axial section through a torque converter according to the invention.

The torque converter according to the present invention is characterized primarily in that the main reaction member which is fully sufficient for the torque conversion has associated therewith a smaller control reaction member which is driven by the main reaction member through a gear transmission at a speed higher than the speed at which the main reaction member would rotate in the free flow of fluid. The main reaction member withdraws from the flow of fluid some power and conveys the same through the gear system to the control reaction member. This has been made possible by stationarily journalling the transmission gears in the casing of the converter. This arrangement also makes it possible when the two reaction members are freely rotating to absorb the torque of the pump and thereby to establish an equilibrium between the torques of the pump, the turbine and the reaction members. By selecting the transmission ratio accordingly, it can be assured that the speed of the turbine will not drop when the turbine is under no load.

Referring now to the drawing in detail, the torque converter shown therein comprises a shaft 1 having keyed thereto a fluid pump 2. The shaft 1 is driven by a motor (not shown in the drawing). The converter furthermore comprises a turbine 3 journalled in bearings 4 and 5 and adapted to convey its output through the gear 6 to an output shaft 30. The input shaft 1 is journalled in the turbine 3 by means of anti-friction bearings 7.

Figure 2:
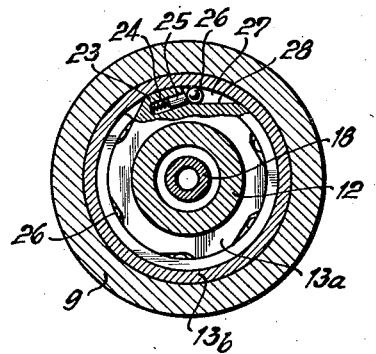
Fig. 2 is a section taken along the line II—II of Fig. 1.

The casing of the converter comprises the casing members 8 and 9. The converter furthermore comprises a main reaction member or guide stage 11 which together with the casing confines the channel 10. The main reaction member 11 has connected thereto, for instance by bolts (not shown), a flanged sleeve 12 which is journalled within a one-way brake generally designated 13. The one-way brake 13 comprises an inner ring 13a and an outer ring 13b. The inner ring 13a is fixedly mounted on the flanged sleeve 12 while ring 13b is fixedly arranged in the casing 9. The inner ring 13a is provided with inclined bores 23 having mounted therein small pressure springs 24, bolts 25 and rollers 26. The rollers 26 are by the springs 24 through the bolts 25 continuously pressed outwardly. The chambers 27 for receiving the rollers 26 are confined on one hand by the inner surfaces of the outer ring 13b and on the other hand by surfaces 28 forming therewith an acute angle. If the inner ring is turned toward the left with regard to Fig. 2, the rollers 26 wedge themselves between the respective inner surface of the outer ring 13b and the adjacent surface 28 thereby preventing a rotation of the inner ring 13a. If the inner ring is turned toward the right with regard to Fig. 2, the rollers 26 move into the wider portion of the chambers 27 thereby allowing an unimpeded rotation of the inner ring 13a. The arrangement of the one-way brake 13, therefore, makes it possible that the main reaction member 11 which is connected to sleeve 12 with the inner ring 13a can rotate in one direction of rotation only whereas its rotation in the other direction is blocked.

As has been clearly shown in Fig. 1, the flanged sleeve 12 has fixedly connected thereto a gear 14 which meshes with a gear 15a of a double gear additionally comprising the gear 15. The gear 15a, 15 is rotatably supported by a pivot 16 which is secured to the lid 21 closing one end of the housing member 9. The double gear 15, 15a driven by the gear 14 drives a gear 17 which is fixedly connected to or is integral with the control or auxiliary reaction member or guide stage 18 journalled in an anti-friction bearing 19 and a bushing 20. Thus, the step-up gear train composed of the gears 14, 15a, 15 and 17 drivingly connects the reaction members 11 and 18 with each other and, since reaction member 11 is rotated forwardly by the fluid in the torque converter circuit during the fluid coupling stage of operation, the said gear train drives the reaction member 18 forwardly at a speed higher than that of the reaction member 11. The supply of operating fluid or oil is effected through conduit 22 which is connected to the lid 21.

It is, of course, to be understood that the present invention is, by no means, limited to the particular construction shown in the drawing but also comprises any modifications within the scope of the appended claims.

What I claim is:

1. In a fluid operable torque converter: a pump wheel, a turbine, a first reaction member interposed between said turbine and said pump wheel so as to follow said turbine and to precede said pump wheel when looking in the direction of flow of the fluid for operating said torque converter, one-way brake means associated with said first reaction member to prevent reverse rotation of said first reaction member while allowing free forward rotation thereof, a second reaction member interposed between said first reaction member and said pump wheel, and a step-up gear train interposed between and positively drivingly interconnecting said first and second reaction members so as to effect rotation of said second reaction member by said first reaction member at a speed higher than that of said first reaction member and in the same direction as the latter.

2. In a fluid operable torque converter: a housing, an input shaft, a pump wheel drivingly connected to said input shaft, a turbine rotatably journalled in said housing, an output shaft drivingly connected to said turbine, a first reaction member provided with a hollow hub co-axially arranged with regard to said input shaft and provided with a first pinion, a clamping roller one-way brake having an outer ring fixedly mounted in said housing and having an inner ring fixedly mounted upon said hub, said one-way brake being designed to prevent reverse rotation of said first reaction member but to allow free forward rotation thereof a second reaction member having a shaft extending through and being journalled within the hub of said first reaction member, said second reaction member being interposed between said first reaction member and said pump wheel and having its shaft provided with a second pinion, and gear means journalled in said housing and respectively meshing with said first and second pinions, said pinions and said gear means together forming a step-up gear train between said first reaction member and said second reaction member to effect rotation of said second reaction member by said first reaction member at a speed higher than that of said first reaction member and in the same direction as the latter.

No references cited.